US006147024A

United States Patent [19]

Shamshoum et al.

[11] Patent Number: 6,147,024

[45] Date of Patent: Nov. 14, 2000

[54] CATALYST SYSTEMS FOR IMPROVED STEREOSELECTIVITY AND BROADER MOLECULAR WEIGHT DISTRIBUTION IN POLYMERIZATION OF OLEFINS

[75] Inventors: Edwar S. Shamshoum, Houston; David John Rauscher, Webster; Douglas Alan Burmaster, Houston, all of Tex.

[73] Assignee: Fina Technology, Inc, Houston, Tex.

[21] Appl. No.: 09/351,025

[22] Filed: Jul. 12, 1999

Related U.S. Application Data

[62] Division of application No. 08/223,916, Apr. 6, 1994.

[51] Int. Cl.[7] .......................... B01J 101/00; B01J 101/10; B01J 101/40; B01J 101/50

[52] U.S. Cl. .......................... 502/103; 502/114; 502/115; 502/116

[58] Field of Search .................................... 502/116, 103, 502/114, 115

[56] References Cited

U.S. PATENT DOCUMENTS 5,494,872 2/1996 Hosaka et al. .......................... 502/115

FOREIGN PATENT DOCUMENTS

| | | |
|---|---|---|
| 0323428 | 7/1989 | European Pat. Off. . |
| 0499599 | 8/1992 | European Pat. Off. . |
| 2306232 | 10/1976 | France . |
| 2554111 | 5/1985 | France . |

*Primary Examiner*—Mark L. Bell
*Assistant Examiner*—Michael J. DiVerdi
*Attorney, Agent, or Firm*—Jim D. Wheelington

[57] ABSTRACT

The present invention provides a catalyst for the polymerization of olefin that exhibits improved selectivity and broader molecular weight distribution in the polymer product. The catalyst is a conventional supported Ziegler-Natta catalyst in combination with a mixture of at least two electron donors, both having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different. This catalyst produces polypropylene having xylene solubles of 1–7 to 5.1 wt % and a molecular weight distribution of about 10.

10 Claims, 2 Drawing Sheets

CATALYST SYSTEMS FOR IMPROVED STEREOSELECTIVITY AND BROADER MOLECULAR WEIGHT DISTRIBUTION IN POLYMERIZATION OF OLEFINS

This is a divisional of copending application Ser. No. 08/223,916 filed Apr. 6, 1994.

BACKGROUND

Technical Field

The present invention provides a catalyst system for the polymerization of olefins that include the combination of a conventional supported Ziegler-Natta catalyst with a mixture of different electron donor compounds, both having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different. Preferably, one electron donor is of the formula:

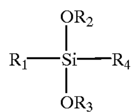

wherein $R_1$ and $R_4$ are both an alkyl or cycloalkyl group containing a secondary or tertiary carbon atom attached to the silicon atom, $R_1$ and $R_4$ being the same; $R_2$ and $R_3$ are alkyl or aryl groups, $R_2$ and $R_3$ being the same or different; and the other is of the formula:

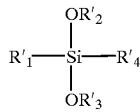

wherein $R'_1$ is an alkyl or cycloalkyl group containing a primary, secondary or tertiary carbon atom attached to the silicon atom, $R'_2$ and $R'_3$ are an alkyl or aryl group, $R'_2$ and $R'_3$ being the same or different; and $R'_4$ is an alkyl group with a primary carbon attached to the silicon atom, $R'_1$ and $R'_4$ being the same or different.

2. Description of Prior Art

Catalyst systems for the polymerization of olefins are well known in the art. Typically, these systems include a Ziegler-Natta type polymerization catalyst; a co-catalyst, usually an organoaluminum compound; and an electron donor compound, usually an organosilicon compound. Examples of such catalyst systems are shown in the following U.S. Pat. Nos. 4,107,413; 4,294,721; 4,439,540; 4,115,319; 4,220,554; 4,460,701; and 4,562,173; the disclosures of these patents are hereby incorporated by reference. These are just a few of the scores of issued patents relating to catalysts and catalyst systems designed primarily for the polymerization of propylene and ethylene.

A Ziegler-Natta type polymerization catalyst is basically a complex derived from a halide of a transition metal, for example, titanium, chromium or vanadium with a metal hydride and/or a metal alkyl that is typically an organoaluminum compound. The catalyst is usually comprised of a titanium halide supported on a magnesium compound complexed with an alkylaluminum.

The development of these polymerization catalysts has proceeded seemingly in generations of catalysts. The catalyst disclosed in the patents referenced above are considered by most to be third generation catalysts. With each new generation of catalysts, the catalyst properties have improved. Particularly, the efficiencies of the catalysts, as expressed in kilograms of polymer product per gram of catalyst in two hours, have increased from the 1–3 range to the 10–12 range and beyond. Catalysts have been developed that not only have higher efficiencies but also retain their activity over a longer period of time, thus being able to produce more polymer product over the life of the catalyst. Any increase in the efficiency and life of the catalyst leads to lower costs due to lower catalyst consumption, and it also lowers the capital expenditures in building and operating a plant as the size of the reactors are lowered for specific plant capacities and the reactor residence time is lowered. A higher efficiency also leads to a cleaner polymer product thereby avoiding the need to wash or treat the product to remove catalyst ash residuals.

In addition to the improved catalysts, improved activation methods have also lead to increases in the catalyst efficiency. A most recent discovery includes a process for prepolymerizing the catalyst just prior to introducing the catalyst into the reaction zone. This process is disclosed in U.S. Pat. No. 4,767,735 the disclosure of which is hereby incorporated by reference.

In addition to the development of new catalysts and new reaction processes, a discovery of a more appropriate co-catalyst or electron donor to go with the new generation of catalysts in forming a total catalyst system would be of great benefit to the polymerization art especially if it lead to improved stereoselectivity of the polymer product. In such a total catalyst system, a co-catalyst activates the catalyst and provides the initiation of a polymer chain. The co-catalyst that works well with the new generation catalysts is an organoaluminum compound, most typically triethylaluminum (TEAl) or another trialkylaluminum. Examples of other useful organoaluminum compounds include an alkylaluminum dihalide, a trialkoxyaluminum, a dialkylaluminum halide, and a triisobutylaluminum.

An electron donor compound is used in the polymerization reaction to reduce the atactic form of the polymer thereby giving control of and increasing the production of isotactic polymers. Although a broad range of compounds are known generally as electron donors, a particular catalyst may have a specific compound or group of compounds with which it is especially compatible. Discovery of an appropriate type of electron donor which gives significant increases in control of the isotactic index of the desired polymer product and other properties of the product would be highly advantageous.

The present invention comprises such a discovery. It has been surprisingly discovered that a combination of two specific groups of silane compounds serving as electron donors in combination with a conventional supported Ziegler-Natta type of catalyst results in significant increases in stereoselectivity over that for this particular type of catalyst using one of these electron donors alone.

SUMMARY OF THE INVENTION

The present invention provides a system for the polymerization of olefins wherein the system includes the combination of a particular type of catalyst with a mixture of a combination of two specific groups of electron donor compounds which results in significant increases in the stereoselectivity of the catalyst and improved control of the properties of the polymer product. The catalyst is a conventional supported Ziegler-Natta catalyst. The electron donors are of the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different. Preferably, one electron donor is selected from a silane compound of the following formula:

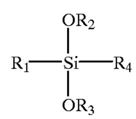

wherein $R_1$ and $R_4$ are both an alkyl or cycloalkyl group containing a secondary or tertiary carbon atom attached to the silicon, $R_1$ and $R_4$ being the same; $R_2$ and $R_3$ are alkyl or aryl groups, $R_2$ and $R_3$ being the same or different; and the other electron donor is selected from a silane compound of the following formula:

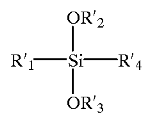

wherein $R'_1$ is an alkyl or cycloalkyl group containing a primary, secondary or tertiary carbon atom attached to the silicon atom, $R'_2$ and $R'_3$ are an alkyl or aryl group, $R'_2$ and $R'_3$ being the same or different; and $R'_4$ is an alkyl group with a primary carbon attached to the silicon atom, $R'_1$ and $R'_4$ being the same or different.

In a preferred embodiment, $R_1$ and $R_4$ are both a secondary alkyl or cycloalkyl group of 3 to 5 carbon atoms or a tertiary alkyl group of at least 4 carbon atoms, $R_1$ and $R_4$ having mirror image symmetry and are the same; $R_2$ and $R_3$ are methyl, ethyl, propyl, or butyl groups and are the same; preferred electron donors are diisopropyldimethoxysilane (DIDS); di-t-butyldimethoxysilane (DTDS) or dicyclopertyldimethoxysilane (CPDS); $R'_1$ is a cyclohexyl or t-butyl group, $R'_2$ and $R'_3$ are methyl, ethyl or propyl groups, and $R'_4$ is a group containing 1–6 carbon atoms; the preferred electron donors are cyclohexylmethyldimethoxysilane (CMDS), di-n-propyldimethoxysilane (DPDS), di-n-butyldimethoxysilane (DBDS) or butylmethyldimethoxysilane (BMDS); the most preferred electron donor is CMDS.

In addition, the system may contain an organoaluminum compound which acts as a co-catalyst. The most preferred organo-aluminum co-catalyst is described by the formula $AIR^*_3$ where R' is an alkyl of from 1–8 carbon atoms and R* may be the same or different. The most preferred co-catalyst is a trialkylaluminum, such as triethylaluminum (TEAI).

The invention also provides a catalyst system as described above, wherein the system is capable of polymerizing an olefin monomer with a xylene solubles of less that about 5.0 wt %. Particular catalyst systems included in the invention may show somewhat lower xylene solubles. The catalyst system may be further characterized by having an isotactic capacity such that the system produces a polymer product in which the xylene soluble atactic form may be kept within the range of 1.7–5.1 wt % of the product while the Si/Ti mole ratio is about 2.

The invention also provides a process for the polymerization of olefins. The process comprises:

1) contacting the conventional supported Ziegler-Natta catalyst with an organoaluminum compound, preferably a trialkylaluminum;
2) contacting the catalyst with a mixture of at least two electron donors either simultaneously with or after contact with the organoaluminum, the electron donor being a silane compound as described by the formula above,
3) pre-polymerizing the catalyst by contacting a small amount of monomer with the catalyst;
4) introducing the catalyst into a polymerization reaction zone containing the organoaluminum compound, the electron donor and the monomer; and
5) withdrawing a polymer product.

The process further comprises withdrawing a polymer product in which the xylene solubles are within the range of below about 5.0 wt %, while the Si/Ti ratio in the reaction zone is within the range 0.5–10.

BRIEF DESCRIPTION OF THE DRAWINGS

A more complete appreciation of the invention and many of the attendant advantages thereof will be readily understood by reference to the following detailed description when considered in connection with the accompanying drawings wherein.

DETAILED DESCRIPTION OF THE INVENTION

Figure 1:
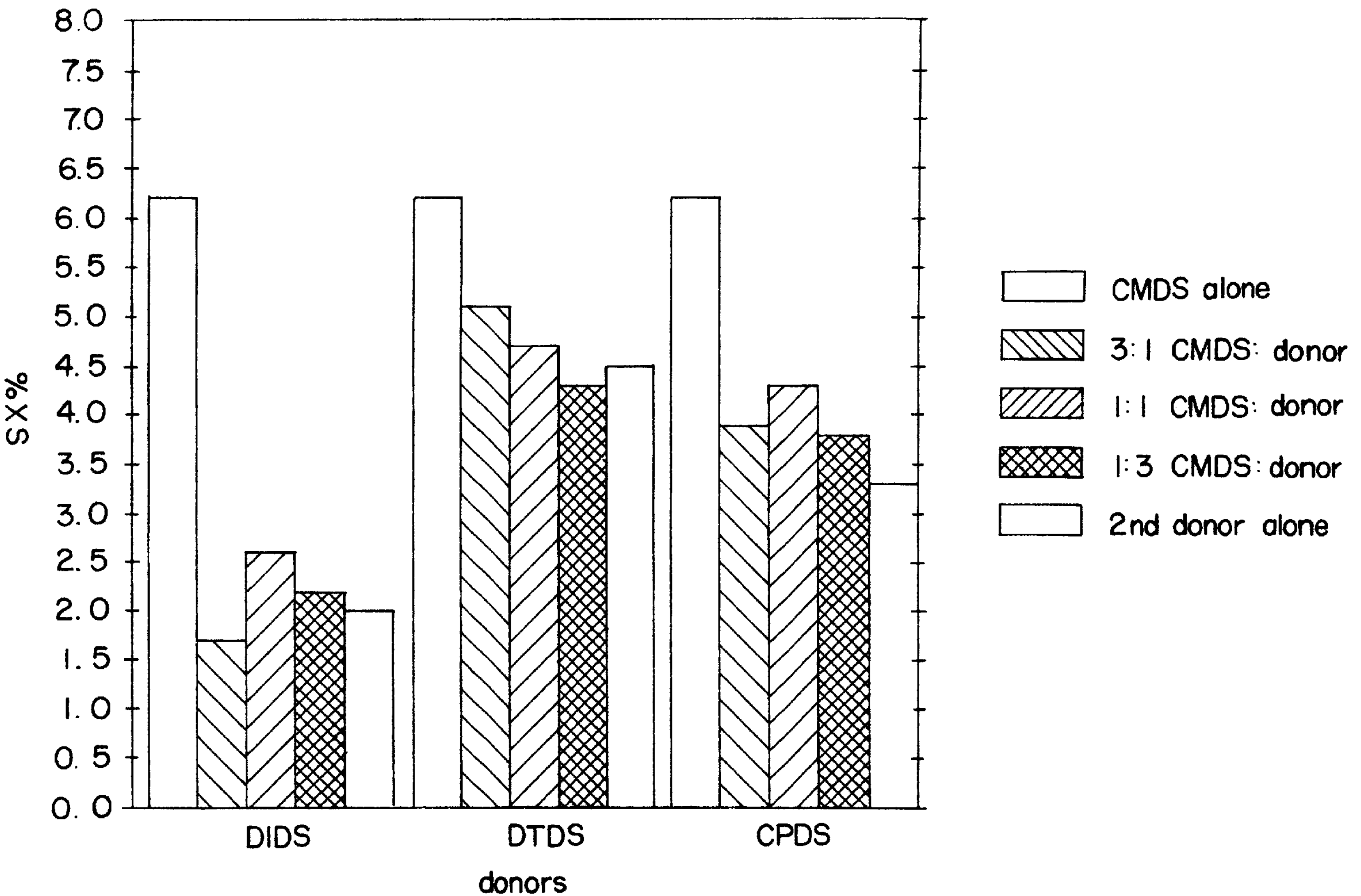
FIG. 1 is a graph of the effect of mixed silyl ethyl donor systems on xylene solubles.

The present invention relates to the combination of a particular group of compounds as electron donors with a particular type of catalyst for use in the polymerization of olefins, particularly propylene. This combination results in a catalyst system that has better control of the xylene solubles of the polymer product than with this type of catalyst with other conventional electron donors. These and other beneficial advantages will become more apparent from the following detailed description of the invention and the accompanying examples.

Electron donors are typically used in two ways in the formation of a Ziegler-Natta catalyst and a catalyst system. First, an internal electron donor may be used in the formation reaction of the catalyst as the transition metal halide is reacted with the metal hydride or metal alkyl. Examples of internal electron donors include: amines, amides, ethers, esters, aromatic esters, ketones, nitriles, phosphines, stibines, arsines, phosphoramides, thioethers, thioesters, aldehydes, alcoholates, and salts of organic acids. The second use for an electron donor in a catalyst system is as an external electron donor and stereoregulator in the polymerization reaction. The same compound may be used in both instances, although typically they are different. A common external electron donor is an organic silicon compound, for example, cyclohexylmethyl dimethoxysilane (CMDS). A description of the two types of electron donors is provided in U.S. Pat. No. 4,535,068, the disclosure of which is hereby incorporated by reference.

As the present invention relates particularly to external electron donors, the term "electron donor" as used herein, refers to the external donor. The external electron donor acts as a stereoselectivity control agent (SCA) to control the amount of atactic form of polymer produced. It may also increase the production of isotactic polymers. Organic silicon compounds are known in the art for use as electron donors. Examples of electron donors that are organic silicon compounds are disclosed in U.S. Pat. Nos. 4,218,339; 4,395,360; 4,328,122; 4,473,660 and 4,927,797. As mentioned, a particular catalyst may produce better results when paired with a particular group of electron donors. Examples of this pairing of catalyst and electron donors are disclosed in U.S. Pat. Nos. 4,562,173; 4,547,552; and 4,927,797. The electron donors of the present invention are of the general formula $SIR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different.

It has been discovered that the combination of two particular groups of electron donors significantly enhances the catalytic properties of a particular catalyst for the polymerization of olefins, i.e., conventional supported Ziegler-Natta catalysts. Any of the conventional supported Ziegler-Natta catalysts can be used in the present invention. The catalyst component of a conventional supported Ziegler-Natta catalyst preferably contains a transition metal compound of the general formula $MR^+_x$ where M is the metal, $R^+$ is a halogen or a hydrocarboxyl and x is the valence of the metal. Preferably, M is a Group IVB, VB or VIB metal, more preferably a Group IVB, and most preferably titanium. Preferably, $R^+$ is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)_3Cl$, $Ti(OC_3H_7)_2Cl_2$, $TiOC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present. One particular Ziegler-Natta catalyst which can be used in the present invention is disclosed in U.S. Pat. Nos. 4,927,797; 4,816,433 and 4,839,321, the disclosures of which are hereby incorporated. In these patents the Ziegler-Natta type catalyst component is described as comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

The support should be an inert solid which is chemically unreactive with any of the components of the conventional Ziegler-Natta Catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The internal electron-donor compounds suitable for preparing conventional Ziegler-Natta catalyst components include ethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate. These esters of phthalic acid are the preferred donors.

When a combination of electron donors are used, the above-described catalyst generally exhibits the same or an increase in efficiency over previously known catalysts, such as those disclosed in U.S. Pat. No. 4,929,797 and U.S. patent application Ser. Nos. 07/895,287; 07/895,488 and 07/895,534, hereby incorporated by reference. It has been discovered that this improved efficiency is accompanied by better operational control of the properties of the polymer product such as improved stereoselect.

One group of electron donors included in the present invention are organic silicon compounds such as those described by the following formula:

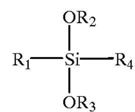

wherein $R_1$ is an alkyl group containing a secondary or tertiary carbon atom attached to the silicon atom; $R_2$ and $R_3$ are alkyl or aryl groups; and $R_4$ is an alkyl group containing a secondary or tertiary carbon atom attached to the silicon atom; $R_1$ and $R_4$ may be the same or different.

The other group of electron donors included in the present invention are organic silicon compounds such as those described by the following formula:

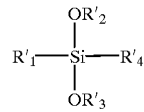

wherein $R'_1$ is an alkyl or cycloalkyl group containing at least one primary, secondary or tertiary carbon atom attached to the silicon atom, $R'_2$ and $R'_3$ are an alkyl or aryl group, $R'_2$ and $R'_3$ being the same or different; and $R'_4$ is an alkyl group with a primary carbon attached to the silicon atom.

In preferred embodiments of the invention, $R_1$ is a secondary alkyl or cycloalkyl group of 3 to 5 carbon atoms or a tertiary alkyl group with at least 4 carbon atoms, $R_1$ and $R_4$ having mirror image symmetry group and are the same, $R_2$ and $R_3$ are methyl, ethyl or propyl groups; $R'_1$ is a cyclohexyl or t-butyl group, $R'_2$ and $R'_3$ are methyl, ethyl or propyl groups, and $R'_4$ is a group containing 1–6 carbon atoms. Preferred electron donors are of one group are diisopropyldimethoxysilane (DIDS), di-t-butyldimethoxysilane (DTDS) and dicyclopertyldimethoxysilane (CPDS) and the preferred electron donors of the other group are di-n-propyldimethoxysilane (DPDS), di-n-butyldimethoxysilane (DBDS), butylmethyldimethoxysilane (BMDS) and cyclohexylmethyldimethoxysilane (CMDS), the most preferred being CMDS.

The combination of DIDS, DTDS or CPDS and CMDS with a conventional supported Ziegler-Natta catalyst yields wholly unexpected results that surpass previously known catalyst systems. The most significant unexpected result obtained from the combination of the above-described catalyst and DIDS, DTDS or CPDS with CMDS is the dramatic increase in the stereoselectivity of the catalyst system as measured by a decrease in the weight per cent of material soluble in xylene and the increase in molecular weight distribution (MWD) which is the ratio of the weight average molecular weight ($M_w$) to the number average molecular weight ($M_n$) [$MWD=M_w/M_n$]. This ratio is also known as polydispersity. The catalyst system, which includes a commercially available conventional supported Ziegler-Natta catalyst, at least two organosilicon electron donors at a molar ratio of from about 1:3 to about 3:1 and an organoaluminum co-catalyst, has been shown to produce polymer having xylene solubles of less than about 5.0 wt %. This catalyst system at a molar ratio of the two electron donors from about 1:3 to about 1:1 has also been shown to produce a polymer having polydispersity of greater than 9. This result is believed to be effective for Si/Ti mole ratios within the range from about 0.5 to about 10. The preferred Si/Ti ratio is in the range from about 2 to about 10. The most preferred Si/Ti molar ratio is in the range from about 2 to about 4.

The catalyst system is capable of controlling the formation of atactic polymer, or xylene solubles, at relatively low levels. When a conventional supported Ziegler-Natta catalyst described herein is paired with one electron donor, such as DIDS or CMDS alone, the system exhibits a relatively high level of the xylene solubles (about 2.0 to 6.0 wt %). The present catalyst system using electron donors such as DIDS, DTDS or CPDS in combination with CMDS exhibits a decrease in the wt % of xylene solubles to about 1.7 up to about 5.1 wt %.

The catalyst system is also capable of controlling the molecular weight distribution of the polymer at relatively high levels. When a conventional supported Ziegler-Natta catalyst described herein is paired with one electron donor, such as DIDS, DTDS, CPDS or CMDS alone, the system exhibits a relatively low level of polydispersity (about 8 to about 9). The present catalyst system using electron donors such as DIDS, DTDS or CPDS in combination with CMDS exhibits an increase in the poldispersity to above 9.

The present invention also provides a process for the polymerization of olefins using the catalyst and the electron donors described by the above formula comprising:

a) selecting a conventional Ziegler-Natta catalyst component;

b) contacting the catalyst with an organoaluminum compound;

c) contacting the catalyst with a mixture of at least two electron donors either simultaneously with or after contact with the organoaluminum, the electron donor being a silane compound as described by the formula above;

d) introducing the catalyst into a polymerization reaction zone containing the organoaluminum compound, the electron donors and the monomer; and e) extracting polymer product from the reactor.

Although the catalyst system may be used in almost any commercially known polymerization process, the preferred process of the present invention includes a pre-polymerization of the catalyst by contacting a small amount of monomer with the catalyst after the catalyst has been contacted with the co-catalyst and the electron donors. One pre-polymerization process is described in U.S. Pat. Nos. 4,767,735, and 4,927,797, hereby incorporated by reference above. As provided in those disclosures, a carrier stream for the catalyst is provided, the catalyst is contacted with the co-catalyst or organoaluminum compound, the catalyst is contacted with the electron donor, the catalyst stream is contacted with a relatively small amount of the total amount of monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. A polymer product may then be withdrawn from the reactor.

The following Examples and Comparative Examples illustrate the present invention and its various advantages in more detail. The results are summarized in Tables 1–5. The catalyst used was prepared with the materials and processes as disclosed in U.S. Pat. Nos. 4,927,797; 4,816,433 and 4,839,321.

EXAMPLE 1

Prior to a polymerization run, all traces of moisture and air were expelled from the reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then 16 mmoles of hydrogen and 1.0 L of propylene were added. The reactor was stirred at 1000 rpm and the temperature was raised to 70° C. 1.0 mmole of TEAI and 0.0075 mmole of DIDS and 0.0025 mmol of CMDS, i.e., a total amount of 0.01 mmole of electron donor, were added to a 40 cc tubular reaction vessel. Ten milligrams of commercially available conventional supported Ziegler-Natta catalyst in a mineral oil suspension were added to the 40 cc reaction cylinder. The TEAI and donor were allowed to pre-contact approximately five minutes, and the catalyst was allowed to pre-contact the TEAI and donor mixture for approximately two minutes. The tubular reaction vessel was then attached to an entry point on the reactor and filled with room temperature liquid propylene which was allowed to polymerize for about five seconds to effect prepolymerization of the catalyst. The contents of the vessel were then flushed into the reactor with 0.2 L of room temperature propylene. The total amount of liquid propylene present in the reactor was about 1.2 L. The polymerization reaction was allowed to proceed for one hour at 70° C., at which point it was terminated by venting the excess propylene and cooling the reactor to room temperature. The reactor was then opened to collect the polymer product which was dried and analyzed.

The efficiency of the catalyst was determined from the mass yield of polymer for the known amount of catalyst used. The efficiency was reported in kilograms of polymer product per gram of catalyst per hour. The Si/Ti mole ratio was calculated from the molar amount of DIDS and CMDS used divided by the molar amount of titanium. The xylene solubles were measured by dissolving the polymer in hot xylene, cooling the solution to 0° C. and precipitating out the isotactic form. The xylene solubles were the wt % of the polymer that was soluble in the cold xylene. In addition, the bulk density of the polymer product was measured and calculated using standard techniques. The results are shown in Table 1.

POLYMERIZATION CONDITIONS reagents:
catalyst: 10 mg raw catalyst
TEAI: 1.0 mmoles
donor: 0.01 mmoles
Al/Ti: 200
Al/Si: 100
Si/Ti: 2 conditions:
temp.: 70° C.
time: 1 hour

EXAMPLE 2

The procedures of Example 1 were repeated except that the amount of DIDS was 0.005 mmoles and the amount of CMDS was 0.005 mmoles. The total amount of electron donor remained at 0.01 mmole. The results are tabulated in Table 1.

EXAMPLE 3

The procedures of Example 1 were repeated except that the amount of DIDS was 0.0075 mmoles and the amount of CMDS was 0.0025 mmoles. The total amount of electron donor remained at 0.01 mmole. The results are tabulated in Table 1.

EXAMPLES 4–6

The procedures of Examples 1–3, respectively, were repeated except DTDS was used instead of DIDS. The results are shown in Table 2.

EXAMPLES 7–9

The procedure of Examples 1–3, respectively, were repeated except CPDS was used instead of DIDS. The results are shown in Table 3.

Comparative Example A

The procedures of Example 1 were repeated except DIDS was used alone. The total amount of electron donor was 0.01 mmole. The results are shown in Table 4.

Comparative Example B

The procedures of Example 1 were repeated except DTDS was used alone. The total amount of electron donor was 0.01 mmole. The results are shown in Table 4.

Comparative Example C

The procedures of Example 1 were repeated except CPDS was used alone. The total amount of electron donor was 0.01 mmole. The results are shown in Table 4.

Comparative Example D

The procedures of Example 1 were repeated except CMDS was used alone. The total amount of electron donor was 0.01 mmole. The results are shown in Table 4.

TABLE 1

DIDS/CMDS SYSTEM

| Example | DIDS mmol | CMDS mmol | Yield g | Xylene Solubles wt % |
|---|---|---|---|---|
| 1 | 0.0075 | 0.0025 | 318 | 1.7 |
| 2 | 0.005 | 0.005 | 315 | 2.6 |
| 3 | 0.0025 | 0.0075 | 409 | 2.2 |

TABLE 2

DTDS/CMDS SYSTEM

| Example | DTDS mmol | CMDS mmol | Yield g | Xylene Solubles wt % |
|---|---|---|---|---|
| 4 | 0.0075 | 0.0025 | 355 | 5.1 |
| 5 | 0.005 | 0.005 | 308 | 4.7 |
| 6 | 0.0025 | 0.0075 | 324 | 4.3 |

TABLE 3

CPDS/CMDS SYSTEM

| Example | CPDS mmol | CMDS mmol | Yield g | Xylene Solubles wt % |
|---|---|---|---|---|
| 7 | 0.0075 | 0.0025 | 381 | 3.9 |
| 8 | 0.005 | 0.005 | 322 | 4.3 |
| 9 | 0.0025 | 0.0075 | 313 | 3.8 |

TABLE 4

| Comparative Example | DIDS mmol | DTDS mmol | CPDS mmol | CMDS mmol | Yield g | Xylene Solubles Wt % |
|---|---|---|---|---|---|---|
| A | 0.01 | — | — | — | 401 | 2.0 |
| B | — | 0.01 | — | — | 263 | 4.5 |
| C | — | — | 0.01 | — | 334 | 3.3 |
| D | — | — | — | 0.01 | 357 | 6.2 |

EXAMPLE 10

The polymer of Example 1 was analyzed for polydispersity. The molecular weight distribution or polydispersity (D) is given as the ratio of weight-average to number-average molecular weight (Mw/Mn). The molecular weight distribution of the polymer was characterized by gel permeation chromatography of filtered polymer samples dissolved in trichlorobenzene at 145° C. The results are tabulated in Table 5.

EXAMPLE 11

The procedures of Example 10 were repeated on the polymer of Example 2. The results are tabulated in Table 5.

Comparative Example E

The procedures of Example 10 were repeated on the polymer of Comparative Example A. The results are shown in Table 6.

Comparative Example F

The procedures of Example 1 and Example 10 were repeated except CMDS was used alone. The results are shown in Table 6.

TABLE 5

| DIDS/CMDS SYSTEM | | | | | |
|---|---|---|---|---|---|
| Example | DIDS mmol | CMDS mmol | Yield g | D(Mw/Mn) | Xylene Solubles wt % |
| 10 | 0.0075 | 0.0025 | 318 | 10.13 | 1.7 |
| 11 | 0.005 | 0.005 | 315 | 9.46 | 2.6 |

TABLE 6

| Comparative Example | DIDS mmol | CMDS mmol | Yield g | D(Mw/Mn) | Xylene Solubles wt % |
|---|---|---|---|---|---|
| E | 0.01 | — | 401 | 9.13 | 2.0 |
| F | — | 0.01 | 264 | 8.33 | 7.8 |

Polymerizations were performed using different silyl ether donors in combination with cyclohexylmethyl dimethoxysilane (CMDS); the total molar amount of donors used and all other conditions were maintained constant. These polymerizations were performed using the same conditions, including the total donor level, and differ only in the relative amounts of each donor used. In many instances, a low level of donor would be advantageous to reduce donor costs and maintain high catalysts activities; therefore, low levels of donor were used (Al/Si=100; Si/Ti=2).

Representative results are given in Tables 1, 2, 3 and 4 and FIG. 1 using CMDS together with: di-isopropyl dimethoxysilane (DIDS); di-t-butyldimethoxysilane (DTDS) or dicyclopertyldimethoxysilane (CPDS). As shown, a mixture of the two electron donors in a molar ratio of from about 1:3 to about 3:1 of the second to the first affords lower polymer xylene solubles over CMDS alone.

Figure 2:
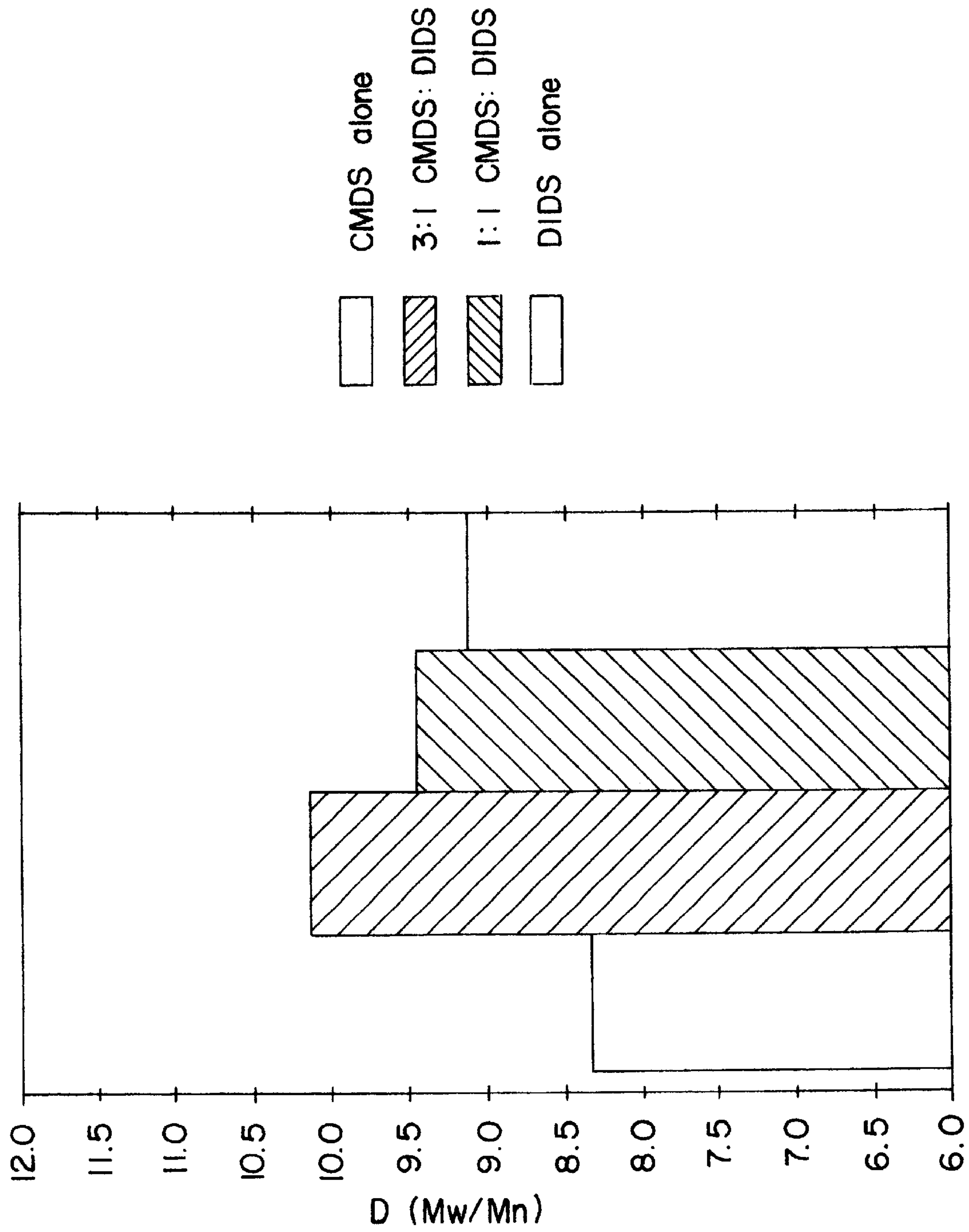
FIG. 2 is a graph of the effect of mixed silyl ethyl donor systems on polydispersity.

It has been shown that a combination of silyl ether donors as catalyst modifiers will enhance polymer polydispersity. As shown in Tables 5 and 6 and FIG. 2, a combination of cyclohexylmethyldimethoxysilane (CMDS) and di-isopropyl dimethoxysilane (DIDS) affords an increase in polydispersity over either donor used alone. A mixture of the two electron donors in a molar ratio of from about 1:3 to about 1:1 of the second to the first affords lower polymer xylene solubles over CMDS alone or the second donor alone increases polydispersity to above 9 and, more specifically, from about 9.5 to about 10. Moreover, this increase is obtained while maintaining low xylene solubles.

Obviously, numerous modifications and variations of the present invention are possible in light of the above teachings. It is therefore to be understood that within the scope of the appended claims, the invention may be practiced otherwise than as specifically described herein.

What is claimed is:

1. A catalyst system for the polymerization and copolymerization of olefins comprising:

(a) a conventional Ziegler-Natta catalyst component comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii);

(b) a mixture of two electron donors wherein one electron donor is diisopropyldimethoxysilane, di-t-butyldimethoxysilane or dicyclopentyldimethoxysilane and the other electron donor is cyclohexylmethyldimethoxysilane in a molar ratio of from about 1:3 to about 3:1 of the second to the first; and (c) triethylaluminum as a co-catalyst, wherein the Si/Ti molar ratio is about 2.

2. A catalyst system for the polymerization and copolymerization of olefins comprising:

(a) a conventional Ziegler-Natta catalyst component comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii);

(b) a mixture of two electron donors wherein one electron donor is diisopropyldimethoxysilane and the other electron donor is cyclohexylmethyldimethoxysilane in a molar ratio of from about 1:3 to about 3:1 of the second to the first; and (c) triethylaluminum as a co-catalyst, wherein the Si/Ti molar ratio is about 2.

3. A catalyst for polymerization of propylene, comprising:

(a) a conventional Ziegler-Natta catalyst component which comprises a transition metal compound of the general formula $MR^+_x$ where M is titanium, $R^+$ is a halogen or a hydrocarboxyl and x is the valence of titanium;

(b) an organoaluminum compound;

(c) a mixture of at least two electron donors, the first described by the formula:

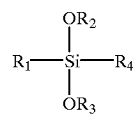

wherein $R_1$ and $R_4$ are both an alkyl or cycloalkyl group containing a secondary or tertiary carbon atom attached to the silicon atom, $R_1$ and $R_4$ being the same, $R_2$ and $R_3$ are alkyl or aryl groups, $R_2$ and $R_3$ being the same or different, and the second is cyclohexylmethyldimethoxysilane, wherein the two electron donors are in a molar ratio of from about 1:3 to about 1:1 of the second to the first, and wherein silicon and titanium are in a molar ratio (Si/Ti molar ratio) within the range from about 0.5 to about 10.

4. The catalyst of claim 3 wherein the first electron donor is diisopropyldimethoxysilane.

5. A catalyst for the polymerization of propylene, comprising:

(a) a conventional Ziegler-Natta catalyst component which comprises a transition metal compound of the general formula $MR^+_x$ where M is titanium, $R^+$ is a halogen or a hydrocarboxyl and x is the valence of titanium;

(b) an organoaluminum compound;

(c) a mixture of at least two electron donors, the first described by the formula:

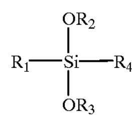

wherein $R_1$ and $R_4$ are both an alkyl or cycloalkyl group containing a secondary or tertiary carbon atom attached to the silicon atom, $R_1$ and $R_4$ being the same, $R_2$ and $R_3$ are alkyl or aryl groups, $R_2$ and $R_3$ being the same or different, and the second is cyclohexylmethyldimethoxysilane, wherein the two electron donors are in a molar ratio of from about 1:3 to about 3:1 of the second to the first, and wherein silicon and titanium are in a molar ratio (Si/Ti molar ratio) within the range from about 0.5 to about 10.

6. The catalyst of claim 5 wherein the first electron donor is diisopropyldimethoxysilane, di-t-butyldimethoxysilane or dicyclopentyldimethoxysilane.

7. A catalyst for the polymerization of propylene, comprising:

(a) a conventional Ziegler-Natta catalyst wherein the conventional Ziegler-Natta catalyst comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii);

(b) an organoaluminum compound;

(c) a mixture of at least two electron donors, the first described by the formula:

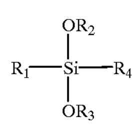

wherein $R_1$ and $R_4$ are both an alkyl or cycloalkyl group containing a secondary or tertiary carbon atom attached to the silicon atom, $R_1$ and $R_4$ being the same, $R_2$ and $R_3$ are alkyl or aryl groups, $R_2$ and $R_3$ being the same or different, and the second is cyclohexylmethyldimethoxysilane wherein the two electron donors are in a molar ratio of from about 1:3 to about 1:1 of the second to the first, and wherein the Si/Ti molar ratio is within the range from about 0.5 to about 10.

8. The catalyst of claim 7 wherein the first electron donor is diisopropyldimethoxysilane.

9. A catalyst for the polymerization of propylene, comprising:

(a) a conventional Ziegler-Natta catalyst component wherein the conventional Ziegler-Natta catalyst comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii);

(b) an organoaluminum compound;

(c) a mixture of at least two electron donors, the first described by the formula:

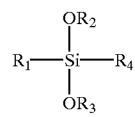

wherein $R_1$ and $R_4$ are both an alkyl or cycloalkyl group containing a secondary or tertiary carbon atom attached to the silicon atom, $R_1$ and $R_4$ being the same, $R_2$ and $R_3$ are alkyl or aryl groups, $R_2$ and $R_3$ being the same or different, and the second is cyclohexylmethyldimethoxysilane wherein the two electron donors are in a molar ratio of from about 1:3 to about 3:1 of the second to the first, and wherein the Si/Ti molar ratio is within the range from about 0.5 to about 10.

10. The catalyst of claim 9 wherein the first electron donor is diisopropyldimethoxysilane, di-t-butyldimethoxysilane or dicyclopentyldimethoxysilane.

* * * * *